June 24, 1930.   P. F. RICE   1,767,699
LIQUID LEVEL INDICATOR
Filed Sept. 10, 1923
FIG.1.
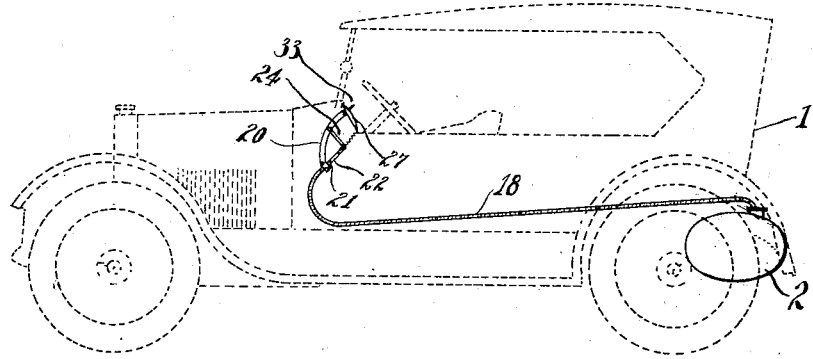
FIG.2.
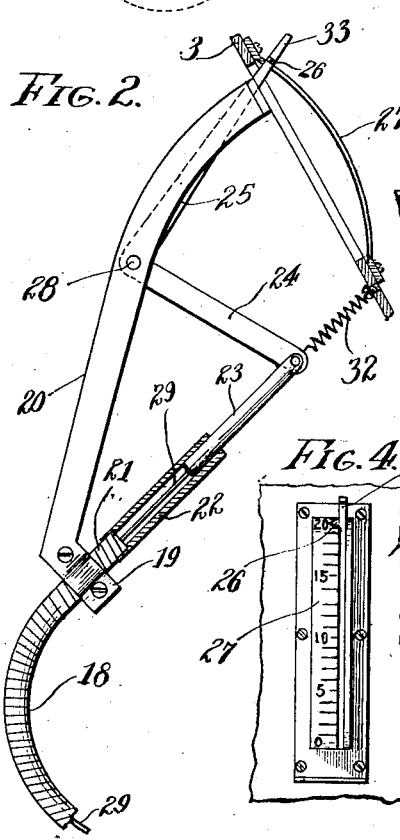
FIG.3.
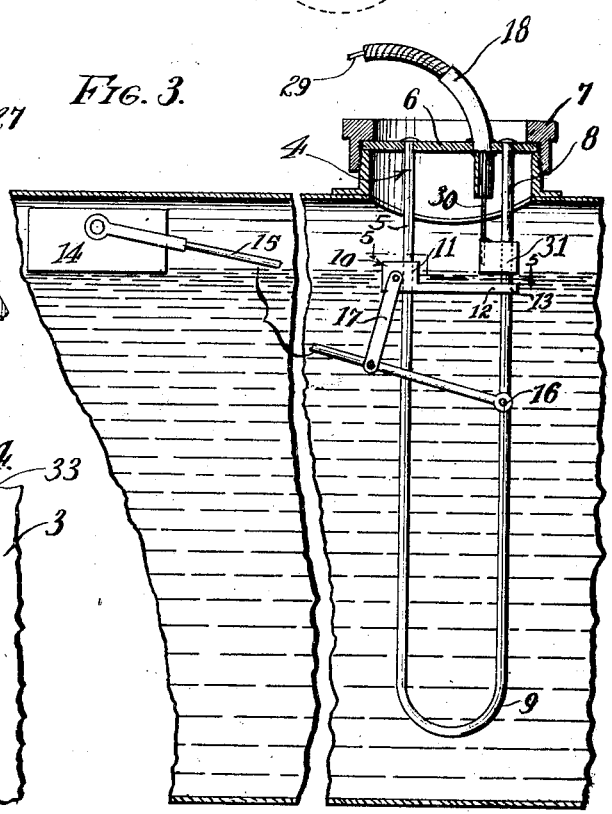
FIG.4.
FIG.5.
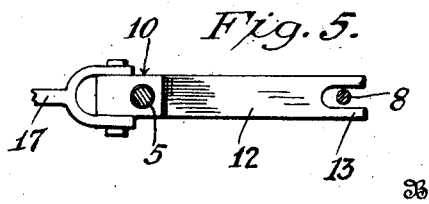
INVENTOR
Percy F. Rice.
By Lyon & Lyon
Attorneys Patented June 24, 1930

1,767,699

UNITED STATES PATENT OFFICE

PERCY F. RICE, OF TUSTIN, CALIFORNIA

LIQUID-LEVEL INDICATOR

Application filed September 10, 1923. Serial No. 661,839.

This invention relates to an indicating gage for indicating the position of any moving part which moves in accord with some other part, the position of which must be indicated. While the invention is applicable for indicating the position of any moving part, in the present specification, I have described it as applied to a gage for indicating the amount of gasolene still remaining in a gasolene tank in an automobile.

The general object of the invention is to provide simple, accurate and reliable means for indicating the position of such a movable member, to an operator located a short distance away. As applied to the gasolene tank of an automobile, one of the objects of the invention is to provide an indicating device in view of the driver of the car which operates to show accurately the amount of gasolene remaining in the tank. One of the objects of the invention is to provide a construction in which the movable member or rider which moves to accord with changes in the liquid level, may move perfectly freely, that is to say, it is unhindered in its movement by any of the parts of the indicator, but when the indicator is to be used, it operates effectively to show to the driver the amount of gasolene remaining in the tank.

The invention consists in the novel parts and combination of parts to be described hereinafter, all of which contribute to produce an efficient indicating gage.

In the drawing:

Figure 1 is a side elevation illustrating the general arrangement of the apparatus as applied to an automobile.

Fig. 2 is a vertical section taken through the instrument board of the automobile and illustrates parts of the mechanism at this point, certain parts being broken away.

Fig. 3 is a vertical section taken through the gasolene tank of the automobile, certain parts being broken away.

Fig. 4 is a front elevation of the scale and pointer which cooperates with it on the instrument board or dash of the automobile.

Fig. 5 is a view taken on the line 5—5 of Fig. 3.

Although features of this invention might be employed in an automatic indicator, the apparatus as described in this specification is only partially automatic, that is to say, it is only automatic in the sense that a movable member, stop, or rider moves automatically in accordance with changes in the liquid level. This rider moves freely and is preferably not attached to any of the parts of the indicator proper. I provide hand-operated means to cooperate with the stop, to indicate its position. In its preferred construction the indicator includes a hand-operated pointer and a scale, and when it is desired to ascertain the position of the rider, the driver of the car moves the pointer of the indicator along its scale. This movement of the pointer actuates a gage-member or stem which advances in the path of the rider as far as will be permitted by the rider, the rider operating as a positive stop for the gage member. In this way the stem operates to stop the indicating pointer at a point which indicates the position of the rider, or in other words indicates the amount of gasolene still in the tank.

As applied to an automobile 1, indicated in dotted outlines in Figure 1, the gasolene tank 2 may be located at the rear of the car and at a considerable distance from the driver's seat near the instrument board or dash 3. In applying the invention under these circumstances, I provide a rider which is mounted so as to move in accord with the changes in the level of the gasolene which is to be indicated, and I provide a stem which is connected with the pointer of the indicator, and mounted so as to be movable to and fro along the path of the rider; in this way the rider operates as a stop to limit the movement of the stem and the pointer, and hence when the pointer is moved along the indicating scale it will stop in the position in which it indicates the amount of gasolene in the tank.

In order to accomplish this, I prefer to provide a guide 4 within the tank 2, said guide comprising a guide bar 5 which extends in a substantially vertical direction down toward the gasolene in the tank, the upper end of the bar being secured to a removable cap 6 held in place by a screw cap 7. The construction at this point is such as to enable the ordinary screw cap to be removed and the cap 6 and screw cap 7 substituted therefor. The guide 4 may include a second guide bar 8 which may be formed integral with the bar 5 and connected to it by a bend 9 disposed near the bottom of the tank. On the guide 4, a movable rider 10 is mounted, said rider consisting of a clutch member in the form of a clutch sleeve 11 which slides freely on the bar 5, and this rider has an extension 12 which projects in a plane transverse to the axis of the guide 4, and has a bifurcated extremity 13 which receives the bar 8. In this way the bar 8, prevents the sleeve 11 from twisting on the guide bar 5 but permits it to move freely along the bar.

Any suitable means may be provided for moving the rider 10 up and down to accord with changes in the level of the gasolene. I prefer to connect the float and rider by means operating to give the rider a reduced amount of movement as compared with the movement of the float. For example, a float 14 of common construction may be provided attached to a lever 15 having a fulcrum pin 16 on the lower portion of the bar 8. This lever 15 is connected by a forked link 17 with the rider 10 so that as the float moves up and down the link 17 will impart movement to the rider.

Through the cap 6 I attach by soldering the end of a flexible tubing 18 which is supported on the car body in any suitable manner, with its other end extending up to a point near the dash 3 where it may be secured by a clamp 19 formed on the lower end of a bracket 20 secured to the dash, see Figure 2. Just beyond the clamp 19, the flexible portion 21 of this tube is soldered to a tubular guide 22 in which slides a plunger 23 actuated by an arm 24 of a bell-crank lever, the other arm 25 of the bell-crank lever projecting through a slot in the dash 3 and carrying the pointer 26 to cooperate with a curved scale 27 in the form of a plate bent around the axis of a fulcrum pin 28 as an axis.

To the plunger 23 there is attached a flexible stem or wire 29 which extends through the metallic tube so that its rear end 30 projects from the rear end of the tube in a direction parallel with the guide bar 5, see Figure 3. I prefer to attach the end 30 of the wire 29 to a small block 31 which slides along the bar 8. A coil spring 32 is provided for normally holding the pointer 26 in its most elevated position.

In operating the device, the driver of the car seizes the thumb piece 33 which is formed at the end of the lever 25, see Figure 2, and pulls it down as far as it will go. As this movement takes place the plunger 23 is forced inwardly and the stem 29 slips along in the flexible tubing 18 thereby producing a downward movement of the rear end 30 of the stem, and this forces the block 31 down against the extension 12 which causes the rider to operate as a clutch, so that it becomes a positive stop to limit the movement of the stem and the movement of the indicating pointer 26.

The location of the end 30 of the flexible stem is remote from the axis of the guide bar 5 so that the thrust of the stem against the extension 12 will act out of alignment with the plane of the guide, and hence will not slide the rider or stop along the guide bar 5. In other words, the sleeve 11 will act as a clutch due to the impingement of the stem, causing the rider to clutch the guide and resist this thrust, and the rider will remain stationary in spite of the force which is exerted by the flexible stem against it. In order to graduate the scale 27, it is simply necessary to fill the tank, a gallon at a time, and then indicate on a blank scale the position of the pointer 26 which corresponds to this quantity of gasolene in the tank. The scale, of course, reads in a reverse direction, that is to say, the greatest movement of the pointer is permitted in the practical use of the device when the tank is almost empty.

It is understood that the embodiment of the invention described herein is only one of the many embodiments this invention may take and I do not wish to be limited in the practice of my invention nor in my claims to the particular embodiment set forth.

What I claim is:

1. In a liquid level indicating gage, the combination of a hand actuated pointer, a guide extending down through the liquid, a rider in the form of a clutch member mounted to move along the guide, means for moving the rider up or down to correspond with changes in the level of the liquid, said rider consisting of a clutch operating to clutch the guide when pressed by a force acting upon it along a line parallel with, but removed laterally from, the longitudinal axis of the guide, a stem connected with the pointer and mounted with its lower end above the rider and movable independently of the rider, said stem being movable to and fro longitudinally of the guide along the path of the rider but on a line removed laterally from the guide, the impingement of the said stem against the rider operating to clutch the rider on the guide, said rider operating as a positive stop to limit the movement of the stem and the pointer.

2. In a liquid level indicating gage, the combination of a scale and a hand actuated pointer, a guide extending down through the liquid, a rider in the form of a clutch member mounted to slide along the guide, a float connected with the rider for moving the rider up or down to correspond with changes in the level of the liquid, said rider operating to clutch the guide when pressed by a force acting upon it along a line removed laterally from the axis of the guide, a stem connected with the pointer and mounted with its lower end above the rider and movable independently of the rider, and means for guiding the end of the stem along the guide in the path of the rider, but in a line removed laterally from the guide whereby the impingement of the stem against the rider clutches the rider on the guide, said rider operating as a positive stop to limit the movement of the stem and the pointer.

3. In a liquid level indicating gage, the combination of a scale and a hand actuated pointer, a guide bar extending down through the liquid, a rider in the form of a clutch sleeve mounted to slide along the bar, a float connected with the sleeve to move the same up and down in accordance with the changes in the level of the liquid, said rider having an extension projecting transversely to the longitudinal axis of the guide bar, operating when pressed by a force operating on a line removed laterally from the axis of the bar, to clutch the clutch sleeve on the bar, a stem connected with the pointer and having its lower end above the rider and movable independently of the rider, and means for guiding said stem to move to and fro longitudinally of the guide bar along the path of the said extension and along a line removed laterally from the axis of the guide bar whereby the impingement of the stem against the said extension clutches the rider on the guide bar and the rider operates as a positive stop to limit the movement of the stem and the pointer.

4. In a liquid level indicating gage, the combination of a scale and a hand actuated pointer, a substantially vertical guide bar, a rider in the form of a clutch sleeve mounted to slide along the guide bar, a float connected with the rider for moving the rider up or down to correspond with changes in the liquid level to be indicated, said rider having an extension projecting substantially at right angles to the axis of the bar and operating when pressed by a force acting on a line removed laterally from the axis of the bar, to clutch the sleeve on the bar, a second guide bar substantially parallel with the first guide bar, a flexible stem connected with the pointer, means for guiding the said stem along the second named guide bar and so that its end can impinge the said extension at a point remote from the first named guide bar, the impingement of the end of the stem against the said extension operating to clutch the rider on the first named guide bar enabling said rider to operate as a positive stop to limit the movement of the stem and the pointer.

5. In a level indicating gage for a gasolene tank, the combination of a hand-actuated pointer, a guide extending down into the tank, a rider mounted to slide on the guide, and capable of operating as a clutch on the bar, a float connected with the rider to move the same up or down with changes in the level of the gasolene, a flexible tube with a flexible stem therein connected to the hand-actuated pointer, said tube having one end supported adjacent the guide so that the stem may project from the same and move in and out substantially parallel with the guide and in the path of the rider, so that the rider may limit the movement of the stem when thrust downward, and an indicating scale to cooperate with the pointer, said rider having a lateral extension and said stem being mounted in a position to engage the extension at a point removed from the axis of the guide, whereby the rider operates as a clutch, resists the thrust of the stem and remains stationary as a positive stop on the guide when engaged by the stem.

6. In a liquid level indicating gage, the combination of a float, a rider, means for guiding the rider to move up and down in a substantially straight line, means connecting the float with the rider and operating to give the rider a reduced amount of movement compared with the movement of the float, a scale and a hand actuated pointer cooperating with the scale, a member, means connecting said member with the pointer, means for guiding said member to move downward along the path of movement of the rider, said member operating to engage the rider, said rider being constructed in the form of a clutch and operating when engaged by said member to maintain itself fixed on the guide means to limit the movement of the pointer.

7. In a liquid level indicating gage, the combination of a guide extending down through the liquid, a rider in the form of a clutch-member mounted to move along the guide, a float connected with the rider for moving it up or down to correspond with changes in the level of the liquid, said rider operating to clutch the guide when pressed by a force acting upon it on a line removed laterally from the longitudinal axis of the guide, a stem mounted with its lower end above the rider and unconnected with the rider so as to be movable independently of the rider, with means for guiding the stem to move to and fro longitudinally of the guide along the path of the rider but on a line removed laterally from the longitudinal axis of the guide, the impingement of the stem against the rider operating to clutch the rider on the guide, and the rider operating as a positive stop to limit the movement of the stem, an indicating scale, and means connected with the stem and cooperating with the scale to indicate the position of the rider.

Signed at Los Angeles, California this 1st day of September 1923.

PERCY F. RICE.